US011433952B2

(12) United States Patent
Smolik

(10) Patent No.: US 11,433,952 B2
(45) Date of Patent: Sep. 6, 2022

(54) VEHICLE WORK AREA ASSEMBLY

(71) Applicant: Nissan North America, Inc., Franklin, TN (US)

(72) Inventor: David Smolik, Windsor (CA)

(73) Assignee: NISSAN NORTH AMERICA, INC., Franklin, TN (US)

(*) Notice: Subject to any disclaimer, the term of this patent is extended or adjusted under 35 U.S.C. 154(b) by 107 days.

(21) Appl. No.: 17/107,854

(22) Filed: Nov. 30, 2020

(65) Prior Publication Data

US 2022/0169320 A1 Jun. 2, 2022

(51) Int. Cl.
*B62D 33/02* (2006.01)
*B62D 33/027* (2006.01)
*B60P 7/08* (2006.01)

(52) U.S. Cl.
CPC ........ *B62D 33/0273* (2013.01); *B60P 7/0815* (2013.01)

(58) Field of Classification Search
CPC ......... B60P 7/08; B60P 7/0815; B60P 7/0823; B62D 33/03; B62D 33/027; B62D 33/0273
USPC ......... 410/104, 8–12, 96–98, 100, 102, 106, 410/110, 116; 296/57.1
See application file for complete search history.

(56) References Cited

U.S. PATENT DOCUMENTS

| | | | |
|---|---|---|---|
| 3,628,578 A * | 12/1971 | Berg | B27B 5/201 83/928 |
| 6,846,140 B2 | 1/2005 | Anderson et al. | |
| 7,862,269 B2 | 1/2011 | Kovie | |
| 7,874,774 B2 * | 1/2011 | Peterson | B60P 7/0815 410/104 |
| 9,067,525 B1 * | 6/2015 | Ninov | B60P 1/43 |
| 10,336,238 B2 * | 7/2019 | Williams | B60P 7/0815 |
| 2015/0014502 A1 * | 1/2015 | McCaughan | B62D 33/0273 248/229.2 |

OTHER PUBLICATIONS

POWERTEC 71169 48-Inch Universal T-Track with 2 Hold-Down Clamps, Advertisement, 2020.

* cited by examiner

*Primary Examiner* — D Glenn Dayoan
*Assistant Examiner* — Sunsurraye Westbrook
(74) *Attorney, Agent, or Firm* — Global IP Counselors, LLP

(57) ABSTRACT

A vehicle work area assembly includes a tailgate moved to a horizontally oriented position. The tailgate has a main surface with a utility track fixed thereto. A fence accessory is releasably attached to the utility track and is positioned and fixed to any of a plurality of locations to the utility track. The fence accessory defines a stop location for one end of a workpiece. A clamp accessory releasably attaches to the utility track such that the clamp accessory temporarily clamps the workpiece to the main surface such that the workpiece can be measured and/or cut.

15 Claims, 6 Drawing Sheets

VEHICLE WORK AREA ASSEMBLY

BACKGROUND

Field of the Invention

The present invention generally relates to vehicle work area assembly. More specifically, the present invention relates to work area assembly located along a fiat elongated surface of a tailgate of a vehicle and includes a movable fence accessory and a clamp accessory such that the fence accessory provides a stop surface for a workpiece and the clamp accessory clamps the workpiece to the tailgate enabling an individual to measure and cut a workpiece on the tailgate.

Background Information

Vehicles such as pickup trucks have been used by plumbers, carpenters and metal workers (and various other tradesmen) to haul tools, materials and equipment.

SUMMARY

One object of the present disclosure is to provide a tailgate of a vehicle with a smooth surface and a utility track in order to align and clamp a workpiece to the tailgate for performing work on a workpiece, such as cutting the workpiece.

In view of the state of the known technology, one aspect of the present disclosure is to provide a vehicle with a work area assembly that includes a cargo area structure, a tailgate, a fence accessory and a clamp accessory. The cargo area structure defines a tailgate receiving opening and a cargo area. The tailgate is attached to the cargo area structure for pivoting movement between an upright position closing the tailgate receiving opening and a horizontally oriented position exposing the tailgate receiving opening and the cargo area. The tailgate has a main surface that faces upward with the tailgate in the horizontally oriented position. The tailgate further has a utility track fixed to the main surface. The fence accessory is configured and shaped for releasable attachment to the utility track such that the fence accessory can be positioned and fixed at a first location to the utility track, released, repositioned and fixed at a second location to the utility track, the second location being spaced apart from the first location. The fence accessory further has a fence surface defining a stop location for one end of a workpiece. The clamp accessory is configured and shaped for releasable attachment to the utility track such that the clamp accessory can be positioned and fixed at a third location to the utility track, released, repositioned and fixed at a fourth location to the utility track spaced apart from the third location. The third and fourth locations are spaced apart from the first and second locations. The clamp accessory clamps the workpiece to the main surface at one of the third and fourth locations.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
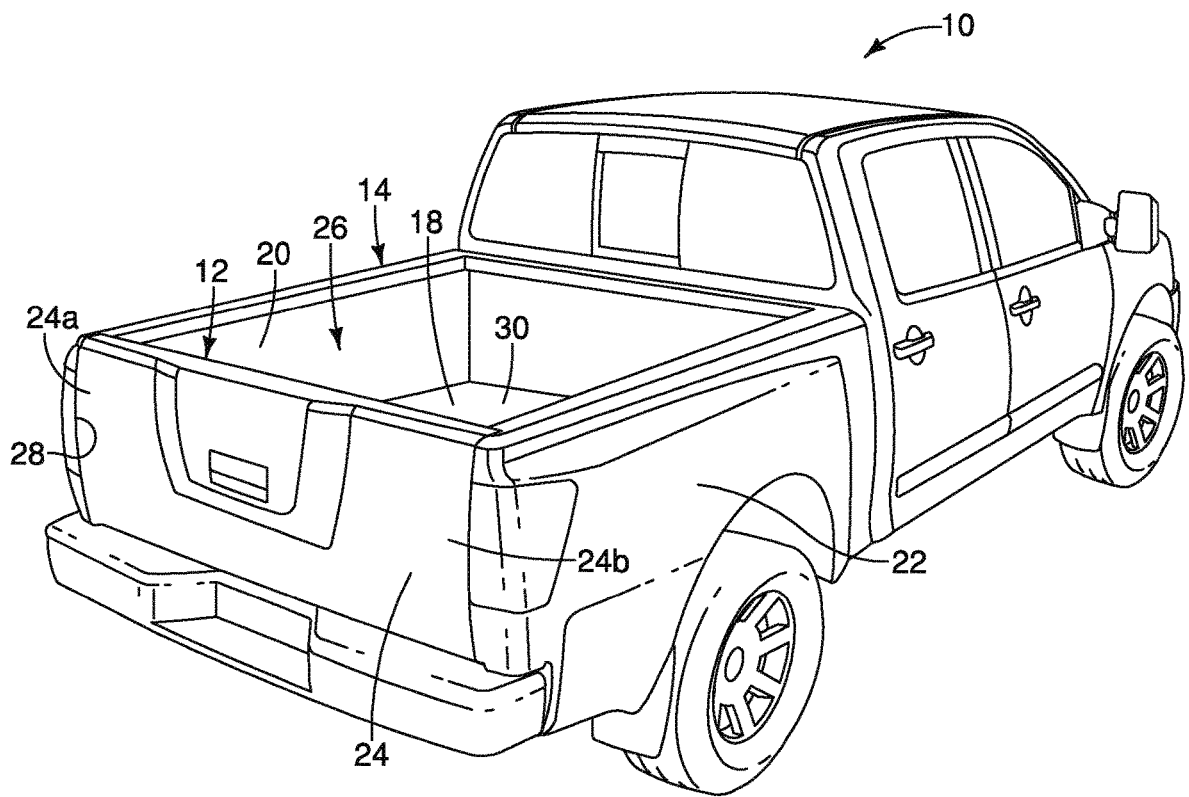
FIG. 1 is a perspective view of a vehicle that includes a work area assembly that provides a tradesman with a space to measure and cut a workpiece in accordance with an exemplary embodiment.

Referring initially to FIG. 1, a vehicle 10 that includes a work area assembly 12 defined along rearward end of a cargo area structure 14 is illustrated in accordance with a first embodiment.

In the depicted exemplary embodiment, the vehicle 10 is a pickup truck. However, it should be understood from the drawings and the description herein that the vehicle can also be, for example, panel truck, station wagon or van with a rear or side access panel that pivots to a horizontal position in a manner similar to the tailgate of a pickup truck.

The cargo area structure 14 in the depicted embodiment is a pickup truck cargo area that has a cargo bed floor 18, first and second side wall structures 20 and 22, and a tailgate 24. The side walls structures 20 and 22 extend along opposite lateral sides of the cargo bed floor 18. The side wall structures 20 and 22 and the cargo bed 18 define a cargo area 26. Rearward ends of the side wall structures 20 and 22 and a rearward end of the cargo bed 18 define a tailgate receiving opening 28 that provides access to the cargo area 26.

The cargo bed floor 18 of the cargo area structure 14 has an approximately horizontal cargo bed surface 30 (with the vehicle 10 parked on level ground). The first wall structure 20 extends along a first side of the cargo bed surface 30 and the second wall structure 22. extends along a second side of the cargo bed surface 30.

The tailgate 24 is attached to a lower area of the first and second side wall structures 20 and 22 of the cargo area structure 14 for pivoting movement between an upright position covering or closing the tailgate receiving opening 28 and a horizontally oriented position exposing the tailgate receiving opening 28 and the cargo area 26. The tailgate 24 has a main surface 32 that faces upward with the tailgate 24 in the horizontally oriented position. In the upright closed position, the tailgate 24 extends between the first wall structure 20 and the second wall structure 22 of the cargo area structure 14.

The tailgate 24 pivots about hinge structures that have respective first parts fixed to lower ends of the first and second side wall structure 20 and 22 and second parts fixed to the lower ends of the first and second lateral sides 24a and 24b of the tailgate 24. Since such hinge structures are conventional pickup truck features, further description is omitted for the sake of brevity.

The main surface 32 of the tailgate 24 is provided with several features that at least partially define the work area assembly 12. Specifically, the main surface 32 includes a utility track 34, scalar demarcations 36 and an elongated flat portion 38 that defines a workpiece receiving surface 40.

The utility track 34 is fixed to the main surface 32 extending from a first lateral side 24a of the tailgate 24 to a second lateral side 24b of the tailgate 24. The utility track 34 has a hollow interior with an overall U-shape, as viewed from the second lateral side 24b of the tailgate 24 in any of FIGS. 8-13. Upper ends of the utility track 34 include inwardly turned lips 42. With the tailgate 24 in the horizontally oriented position as shown in FIGS. 2, 6 and 8-13, the inwardly turned lips 42 of the utility track 34 define a gap 44 therebetween. The tailgate 24 and the utility track 34 are both preferably made of metal and are fixed to one another via mechanical fasteners (not shown) or welding techniques. The tailgate 24 is provided with a recessed area that receives the utility track 34. As shown in FIG. 7, a forward area of the main surface 32 of the tailgate 24 (or lower area of the tailgate 24 with the tailgate 24 in the upright closed orientation) is even with the exposed portion of the utility track 24. However, that portion of the main surface 32 rearward (or above the utility track 34 with the tailgate 24 in the upright closed orientation) of the utility track 34 is slightly lower or recessed relative to the exposed portion of the utility track 34. The exposed portion of the utility track 34 includes the sections of the utility track 34 that define the inwardly turned lips 42 and space or gap 44 of the utility track 34.

The slightly lowered or recessed area adjacent to the utility track 34 corresponds to the elongated flat portion 38. The surface of the elongated flat portion 38 defines the workpiece receiving surface 40, as described in greater detail below.

The elongated flat portion 38 is depicted in the drawings as being directly formed as a part of the tailgate 24. Alternatively, the elongated flat portion 38 can be a separate plate that is attached to the tailgate 24 via mechanical fasteners or welding techniques.

Figure 2:
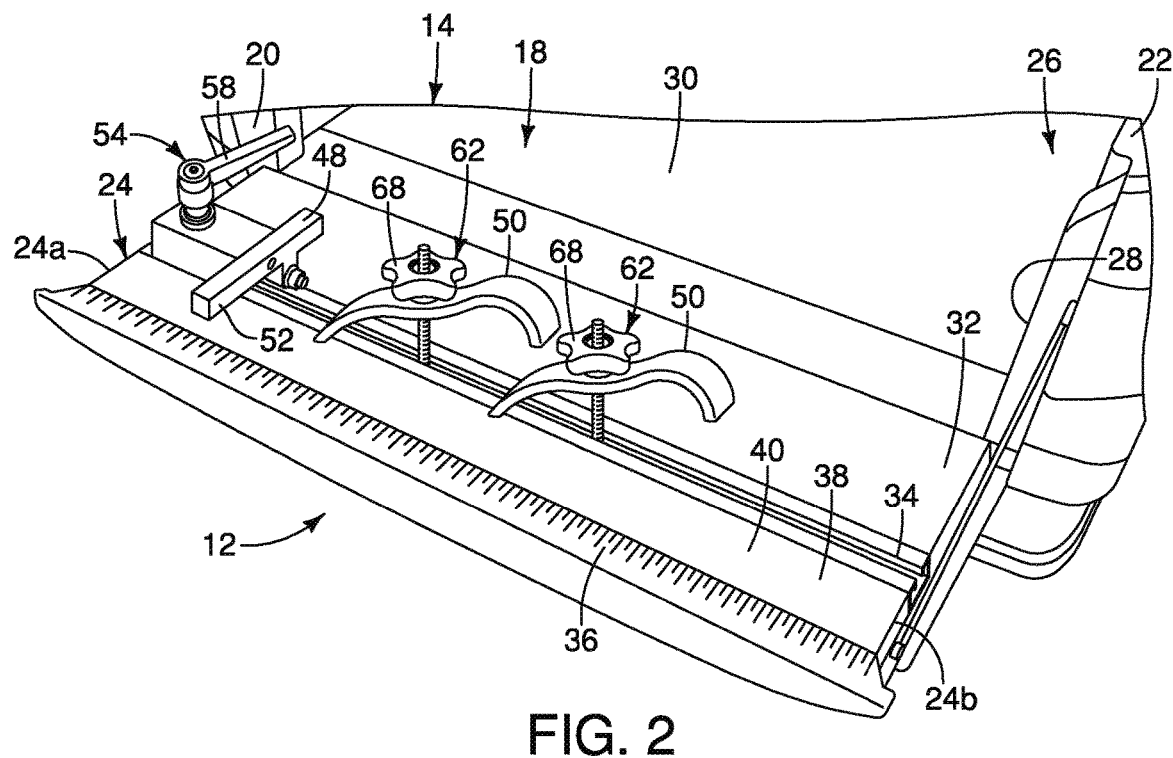
FIG. 2 is a perspective view of a rear end of the vehicle with a tailgate that includes scalar demarcations, a workpiece receiving surface, a utility track, a removable fence accessory and a removable clamp accessory in accordance with the exemplary embodiment.
Figure 3:
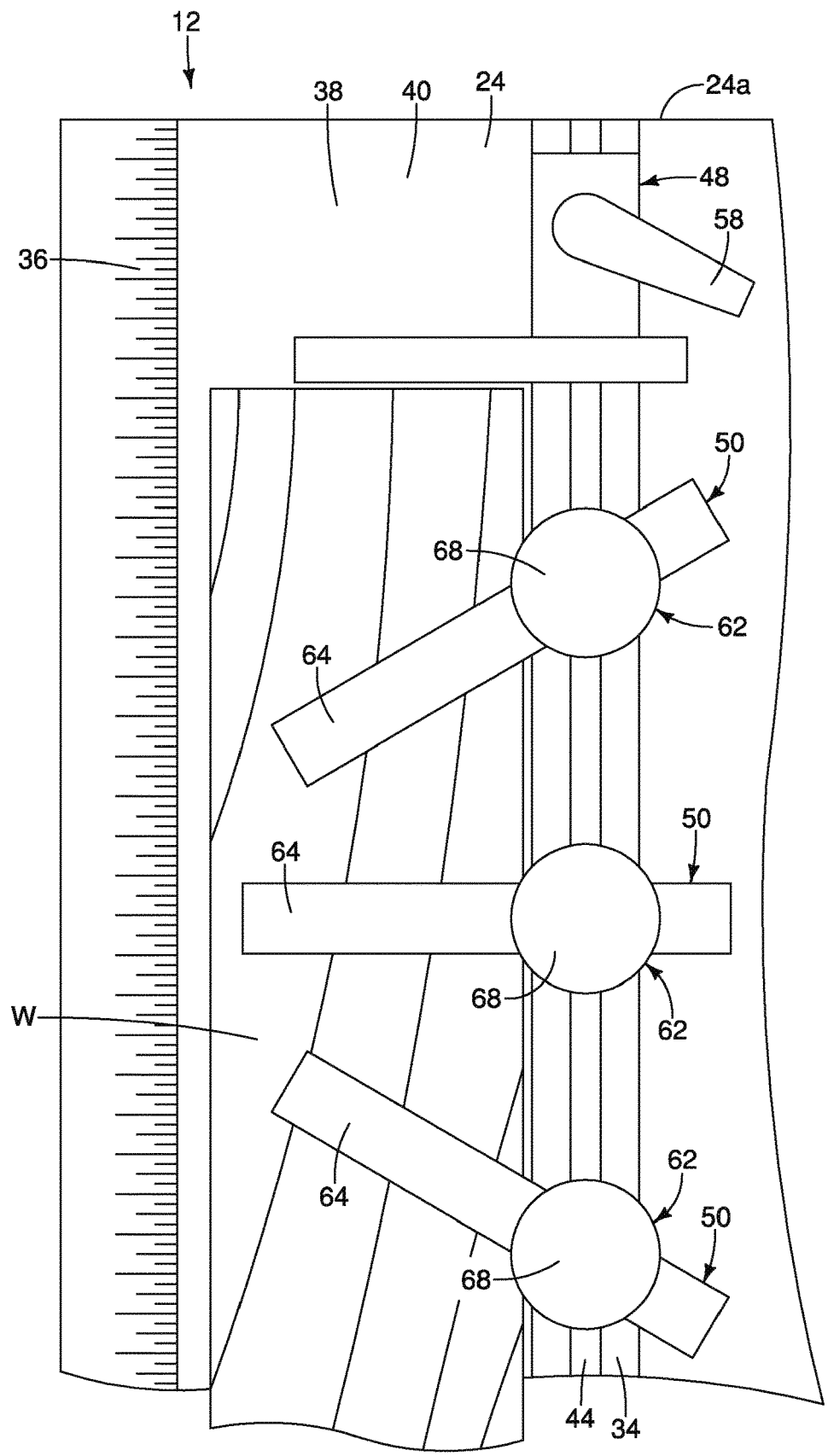
FIG. 3 is a top view of a portion of the tailgate of the vehicle depicted in FIGS. 1 and 2 showing a portion of the scalar demarcations, a portion of the workpiece receiving surface with a workpiece placed thereon, the removable fence accessory and a plurality of the removable clamp accessories at differing locations beside the workpiece receiving surface in accordance with the exemplary embodiment.
Figure 4:
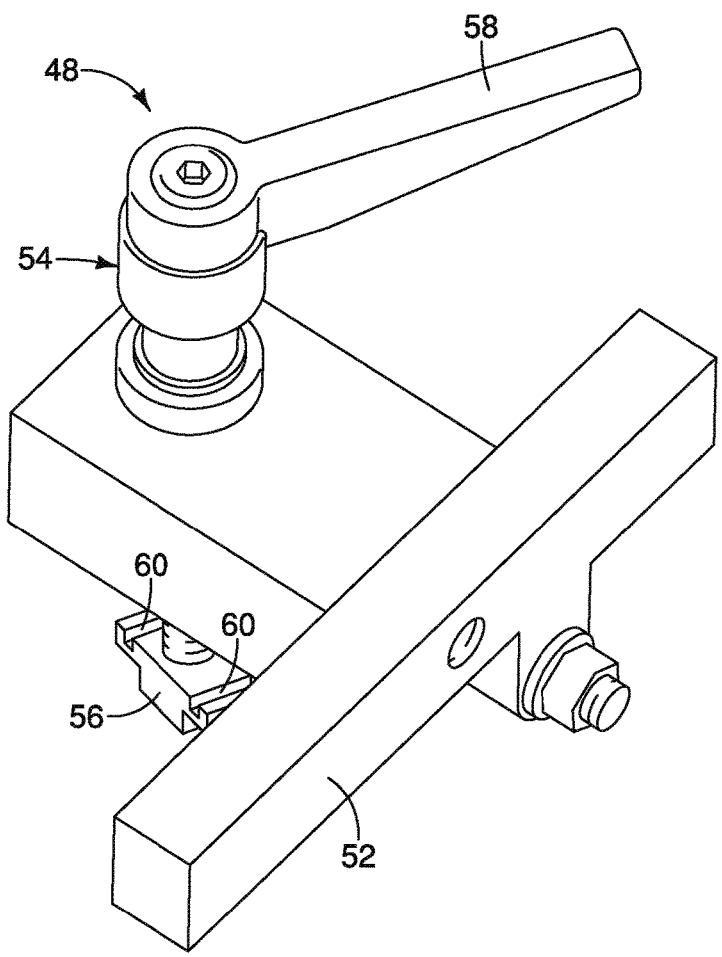
FIG. 4 is a perspective view of the fence accessory removed from the tailgate showing a stop surface and a tightening mechanism in accordance with the exemplary embodiment.
Figure 5:
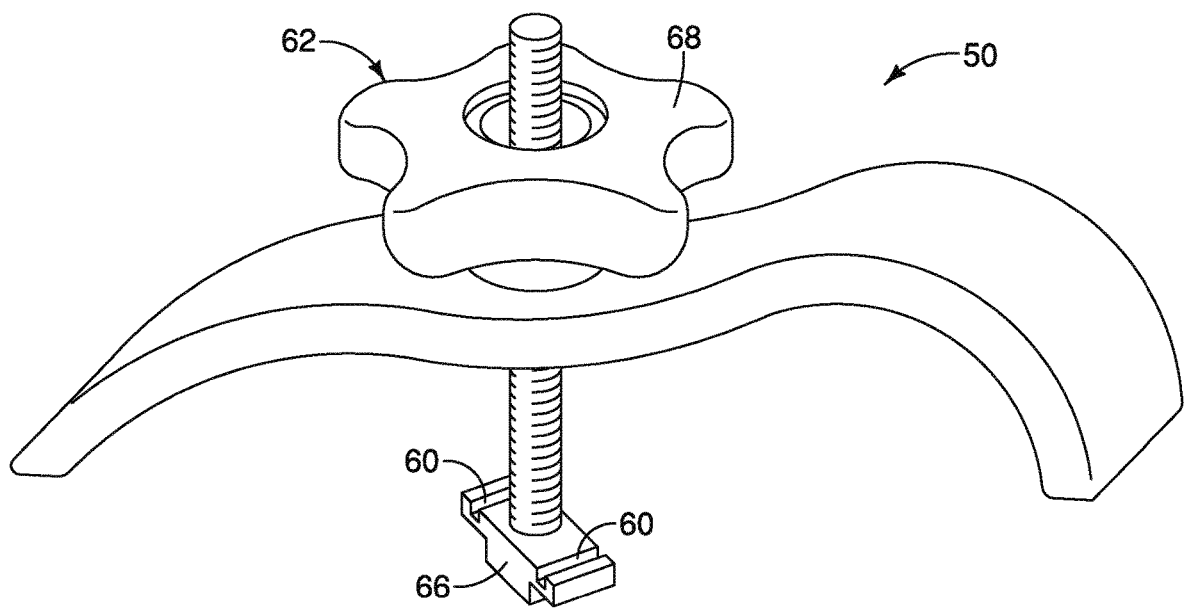
FIG. 5 is a perspective view of the clamp accessory removed from the tailgate showing clamping bar and a tightening mechanism in accordance with the exemplary embodiment.
Figure 6:
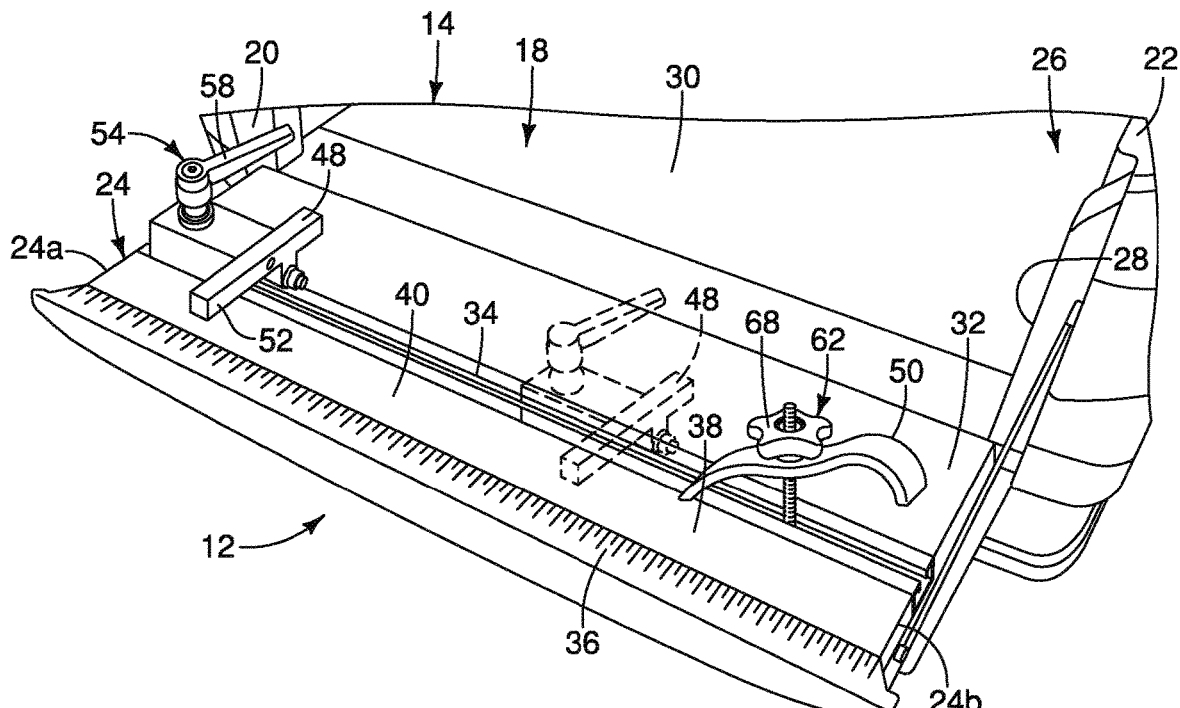
FIG. 6 is another perspective view of the rear end of the vehicle and the tailgate showing examples of locations where the fence accessory can be positioned and temporarily clamped into place along the one of the removable clamp accessories shown in one of a plurality of locations in accordance with the exemplary embodiment.
Figure 7:
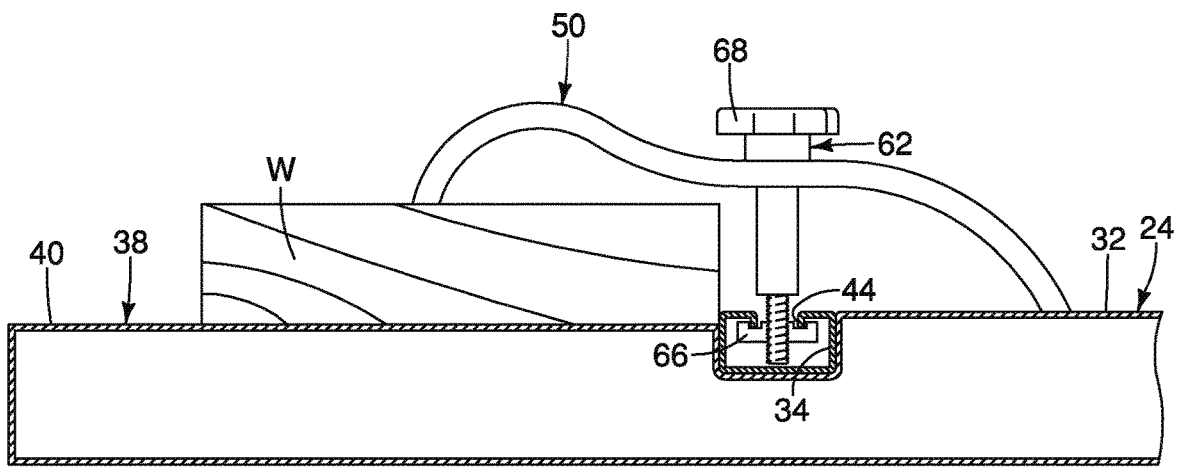
FIG. 7 is a side cross-sectional view of a portion of the tailgate showing the workpiece receiving surface, the workpiece and one of the clamp accessories clamping the workpiece in position against the workpiece receiving surface in accordance with the exemplary embodiment.

As shown in FIGS. 2, 3 and 6, the scalar demarcations 36 are provided along a rearward end of the tailgate 24 (with the tailgate 24 in the lowered horizontally oriented position) which corresponds to an upper end of the tailgate 24 with the tailgate 24 in the upright closed position.

The scalar demarcations 36 can be embossed into the metal of the tailgate 24 or can be a decal adhered to the tailgate 24. Still further, the scalar demarcations 36 can be formed on an end cap that fits over the end of the tailgate 24.

The scalar demarcations 36 can includes markings in standard increments (inches and feed) and/or can be markings in metric increments (millimeters, centimeters and meters). Further, the scalar demarcations 36 extend parallel to the utility track 34 and the elongated flat portion 38, with the workpiece receiving surface 40 being located between the scalar demarcations 36 and the utility track 34. In other words, the scalar demarcations 36, the workpiece receiving surface 40 and the utility track 34 are parallel to one another and extend in a widthwise direction of the tailgate 24 from the first lateral side 24a to the second lateral side 24b.

With the tailgate 24 in the horizontally oriented position, the portion of the main surface 32 of the tailgate 24 between the utility track 34 and the cargo bed floor 18 is co-planar with the cargo bed floor 18.

Figure 8:
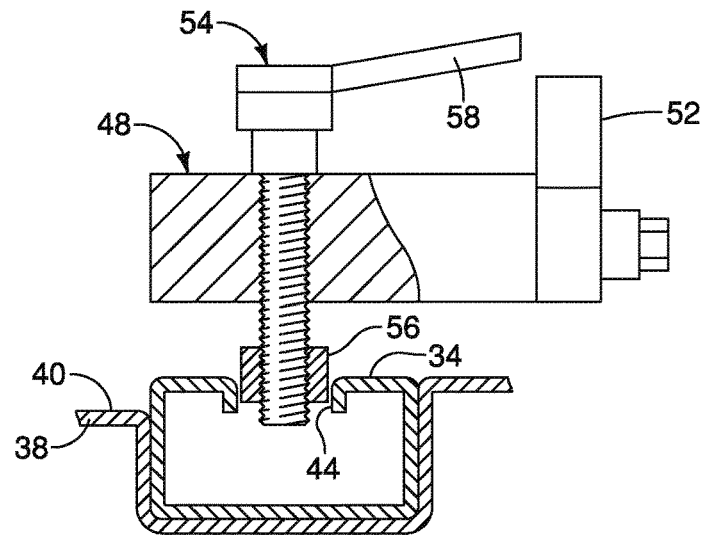
FIG. 8 is a side cross-sectional view of a portion of the tailgate and the utility track showing a clamp end of a tightening mechanism of the fence accessory being inserted into or removed from a gap or slot of the utility track in accordance with the exemplary embodiment.
Figure 9:
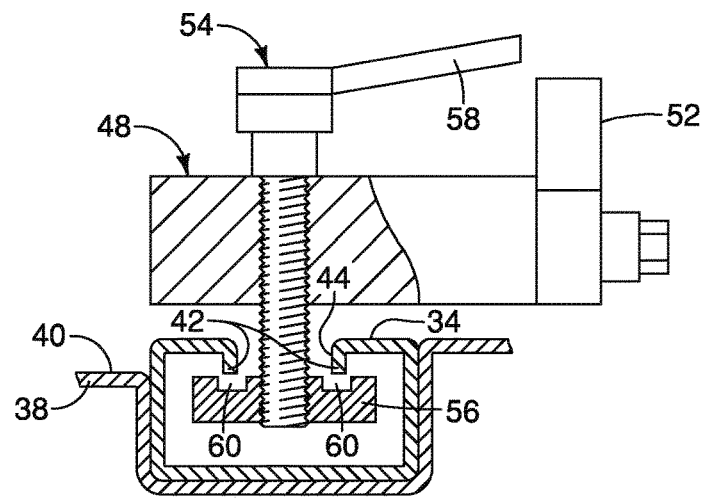
FIG. 9 is another side cross-sectional view of a portion of the tailgate and the utility track similar to FIG. 8 showing the clamp end of the tightening mechanism of the fence accessory inserted into the gap or slot of the utility track in accordance with the exemplary embodiment.
Figure 10:
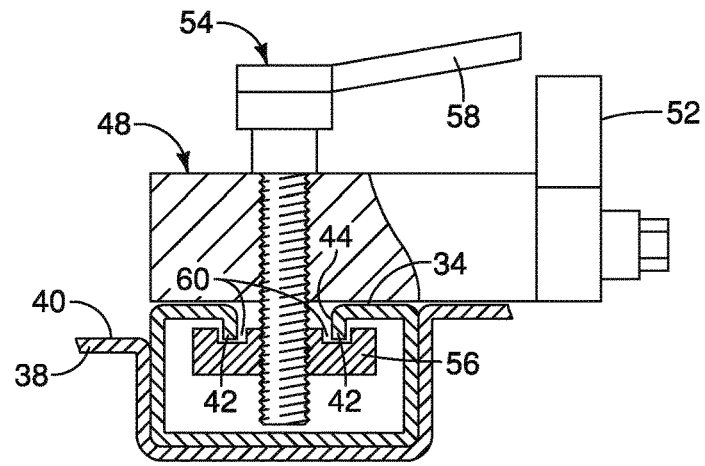
FIG. 10 is yet another side cross-sectional view of a portion of the tailgate and the utility track similar to FIGS. 8 and 9 showing the clamp end of the tightening mechanism of the fence accessory fully tighten within the gap or slot of the utility track thereby fixing the fence accessory in position relative to the utility track and the adjacent workpiece receiving surface in accordance with the exemplary embodiment.

As shown in FIGS. 8-10, the fence accessory 48 has a main body that defines stop surface 52 (also referred to as a stop location 52) and a tightening mechanism 54. The tightening mechanism 54 includes a clamp end 56 and a knob end 58. The clamp end 56 is a block of metal that includes two parallel recesses 60. The knob end 58 includes a knob having a threaded portion that extends through the main body and threads into the clamp end 56. The clamp end 56 has a narrow dimension such that the clamp end 56 can be passed between the inwardly turning lips 42, through the space or gap 44 therebetween and into the hollow interior of the utility track 34, as shown in FIG. 8. Once within the hollow interior of the utility track 34, the clamp end 56 can be rotated 90 degrees to the orientation shown in FIGS. 9 and 10. In this orientation, the two recesses 60 can receive the inwardly turning lips 42 as the knob end 58 is turned. Once tightened, the rotation of the knob end 58 clamps the fence accessory 48 to the utility track 34, as shown in FIG. 10.

The fence accessory 48 is configured and shaped for releasable attachment to the utility track 34 such that the fence accessory 48 can be positioned and fixed at any of a plurality of locations along the utility track 34. For example, as shown in FIG. 6, the fence accessory 48 can be clamped to the utility track 34 (and the tailgate 24) at a first location $L_1$ in solid lines, and, moved to a second location $L_2$ in phantom or dashed lines. The first location $L_1$ and the second location $L_2$ are spaced apart from one another. As is also shown in FIGS. 2 and 6, the fence accessory 48 is oriented such that the stop location 52 or stop surface 52 is perpendicular to the lengthwise direction of the utility track 34. The stop surface 52 extends perpendicular to the workpiece receiving surface 40.

The fence accessory 48 is designed to be moved to an appropriate location relative to measurements made using the scalar demarcations 36 such that a workpiece W can be laid on the workpiece receiving surface 40 as shown in FIG. 3, and then cut to a desired length using a saw (not shown).

One or more clamp accessories 50 can be used to clamp the workpiece W to the workpiece receiving surface 40, as shown in FIGS. 3 and 7. More specifically, one, two or three or more of the clamp accessories 50 can be installed to the utility track 34, tightened and clamped thereto to secure the workpiece W in position against the stop surface 52 and the workpiece receiving surface 40.

Figure 11:
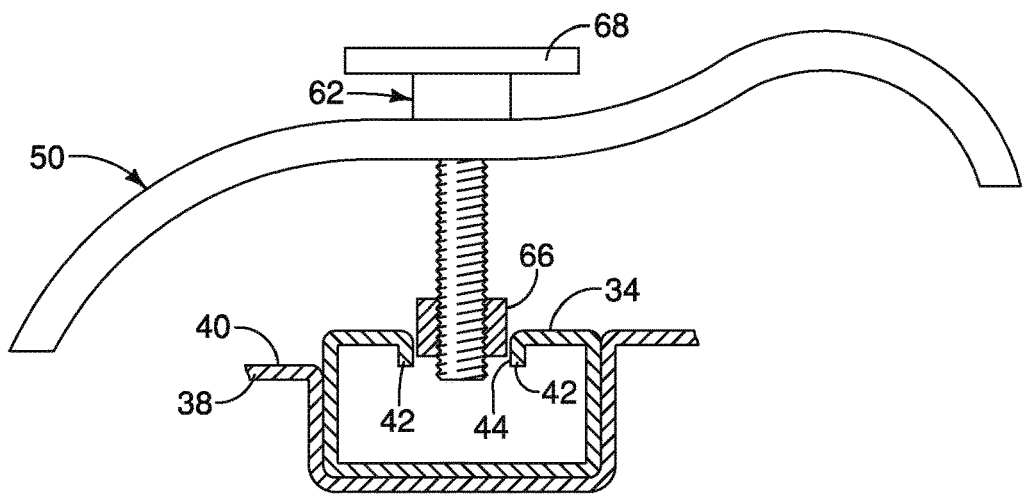
FIG. 11 is a side cross-sectional view of a portion of the tailgate and the utility track showing a clamp end of a tightening mechanism of the clamp accessory being inserted into or removed from a gap or slot of the utility track in accordance with the exemplary embodiment.
Figure 12:
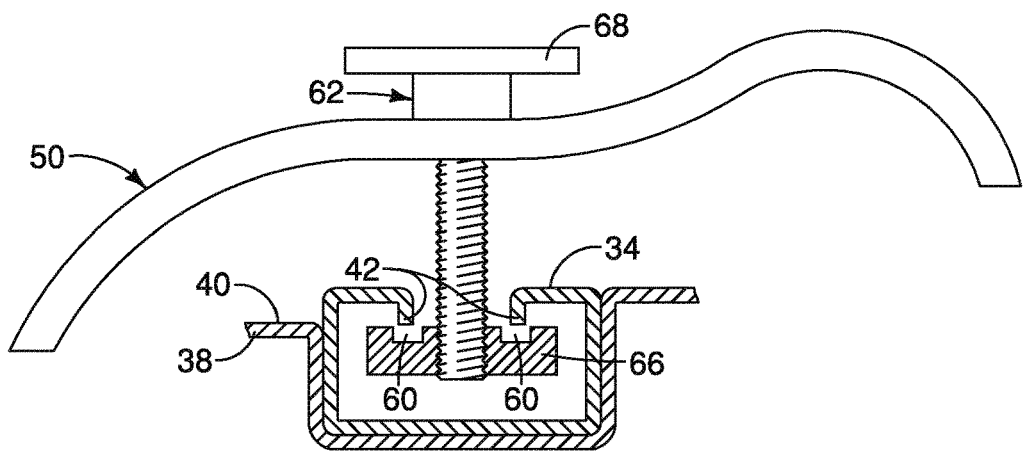
FIG. 12 is another side cross-sectional view of a portion of the tailgate and the utility track similar to FIG. 11 showing the clamp end of the tightening mechanism of the clamp accessory inserted into the gap or slot of the utility track in accordance with the exemplary embodiment.
Figure 13:
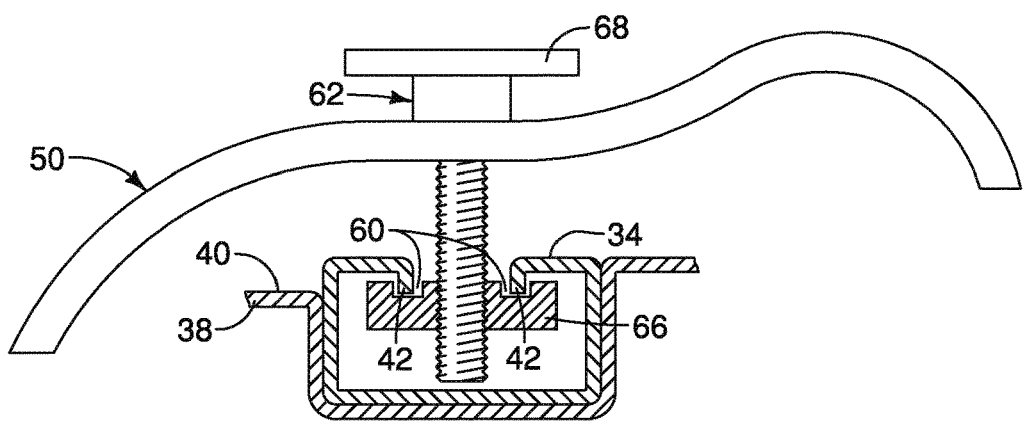
FIG. 13 is yest another side cross-sectional view of a portion of the tailgate and the utility track similar to FIGS. 11 and 12 showing the clamp end of the tightening mechanism of the clamp accessory fully tighten within the gap or slot of the utility track thereby fixing the clamp accessory in position relative to the tailgate utility track and the adjacent workpiece receiving surface in accordance with the exemplary embodiment.

As shown in FIGS. 11-13, each of the clamp accessories 50 includes a tightening mechanism 62 and a clamping bar 64. The tightening mechanism 62 is basically the same as the tightening mechanism 54 of the fence accessory 48. Specifically, the tightening mechanism 62 of the clamp accessory 50 includes a clamp end 66 and a knob end 68. The clamp end 66 is a block of metal that includes two parallel recesses 60. The knob end 68 includes a knob having a threaded portion that extends through the clamping bar 64 and threads into the clamp end 66. The clamp end 66 has a narrow dimension such that the clamp end 66 can be passed between the inwardly turning lips 42, through the space or gap 44 therebetween and into the hollow interior of the utility track 34, as shown in FIG. 11. Once within the hollow interior of the utility track 34, the clamp end 66 can be rotated 90 degrees to the orientation shown in FIGS. 12 and 13. In this orientation, the two recesses 60 can receive the inwardly turning lips 42 as the knob end 68 is turned. Once turned enough, the rotation of the knob end 68 clamps the clap accessory 50 to the utility track 34, as shown in FIG. 13.

The clamp accessory 50 is configured and shaped for releasable attachment to the utility track 34 such that the clamp accessory 50 can be positioned and fixed at any of a plurality of locations along the utility track 34 and orientations, as shown in FIGS. 2, 3 and 6.

The clamp bar 64 of the clamp accessory 50 is depicted as curved or bent elongated bar. As shown in FIG. 7, a first end of the clamp bar 64 can engage the workpiece W and clamp it to the workpiece receiving surface 40 by tightening the knob end 68. A second end of the clamp bar 64 can engage the main surface 32 of the tailgate 24 ensuring a firm clamping force on the workpiece W.

As is shown in FIGS. 2, 3, 6 and 7, once the tailgate 24 is lowered to the horizontal orientation, it partially defines the work area assembly 12 along with the utility track 34. the scalar demarcations 36, the workpiece receiving surface 40, the fence accessory 48 and the clamp accessory 50. The fence accessory 48 and the clamp accessory 50 can be easily installed to the utility track 34, as described above with reference to FIGS. 8-13. The workpiece W can be placed on the workpiece receiving surface 40 and marked to a desired length measured using the scalar demarcations 36. The fence accessory 48 is then moved to a desired location along the utility track 34. The workpiece W is placed on the workpiece receiving surface 40 with one end thereof contacting the stop surface 52 (stop location 52) such that a portion of the workpiece W extends over and away from the second lateral side 24b of the tailgate 24. The extending portion or overhanging portion of the workpiece W can then be cut along the marked desired location using a saw (not shown) or other appropriate hand tool operated by a craftsman.

The workpiece W can be a piece of wood, a pipe, metal bar, or any other material used by a craftsman doing a specific task.

Since both the fence accessory 48 and the clamp accessory 50 are easily removed from the utility track 34 and the tailgate 24, they can be stowed elsewhere within the vehicle 10 and the tailgate 24 returned to the upright closed orientation.

The vehicle 10 includes many features and structural elements other than the features of the work area assembly 12 that are conventional components well known in the art. Since such features and structural elements are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle work area assembly. Accordingly, these terms, as utilized to describe the present invention should be interpreted relative to a vehicle equipped with the vehicle work area assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle work area assembly, comprising:
   a cargo area structure defining a tailgate receiving opening and a cargo area;
   a tailgate attached to the cargo area structure for pivoting movement between an upright position closing the tailgate receiving opening and a horizontally oriented position exposing the tailgate receiving opening and the cargo area, the tailgate having a main surface that faces upward with the tailgate in the horizontally oriented position, the tailgate having a utility track fixed to the main surface; and
   a fence accessory configured and shaped for releasable attachment to the utility track such that the fence accessory can be positioned and fixed at a first location to the utility track, released, repositioned and fixed at a second location to the utility track, the second location being spaced apart from the first location, with a fence surface of the fence accessory defining a stop location for one end of a workpiece; and
   a clamp accessory configured and shaped for releasable attachment to the utility track such that the clamp accessory can be positioned and fixed at a third location to the utility track, released, repositioned and fixed at a fourth location to the utility track spaced apart from the third location, the third and fourth locations being spaced apart from the first and second locations, with the clamp accessory clamping the workpiece to the main surface at one of the third and fourth locations.

2. The vehicle work area assembly according to claim 1, wherein
   the fence accessory has a tightening mechanism that includes a clamp end that extends into the utility track and a knob end threadedly connected to the clamp end such that tightening the knob end pulls the clamp end against inner surfaces of the utility track clamping the fence accessory to the utility track between the clamp end and the knob end.

3. The vehicle work area assembly according to claim 1, wherein
   the clamping accessory includes an elongated bar and a tightening mechanism that includes a clamp end that extends into the utility track and a knob end threadedly connected to the clamp end such that tightening the knob end pulls the clamp end against inner surfaces of the utility track and pulls the elongated bar toward the main surface and against the workpiece: thereby clamping the workpiece between the elongated bar and the main surface.

4. The vehicle work area assembly according to claim 1, wherein
   the tailgate includes scalar demarcations that extend along a portion of the tailgate parallel to the utility track.

5. The vehicle work area assembly according to claim 4, wherein
   the main surface of the tailgate includes an elongated flat portion that defines a workpiece receiving surface that extends in a widthwise direction of the tailgate between the utility track and the scalar demarcations.

6. The vehicle work area assembly according to claim 5, wherein
   the fence accessory has a tightening mechanism that includes a clamp end that extends into the utility track and a knob end threadedly connected to the clamp end such that tightening the knob end pulls the clamp end against inner surfaces of the utility track clamping the fence accessory to the utility track between the clamp end and the knob end with the fence surface extending perpendicular to the workpiece receiving surface.

7. The vehicle work area assembly according to claim 5, wherein
   the clamping accessory includes an elongated bar and a tightening mechanism that includes a clamp end that extends into the utility track and a knob end threadedly connected to the clamp end such that tightening the knob end pulls the clamp end against inner surfaces of the utility track and pulls the elongated bar toward the main surface and the workpiece receiving surface thereby clamping the workpiece between the elongated bar and the workpiece receiving surface.

8. The vehicle work area assembly according to claim 1, wherein
   the cargo area structure includes a cargo bed floor having an approximately horizontal cargo bed surface, a first wall structure extending along a first side of the cargo bed surface and a second wall structure extending along a second side of the cargo bed surface,
   the tailgate extending between e first wall structure and the second wall structures.

9. The vehicle work area assembly according to claim 8, wherein
   the cargo bed floor and the main surface of the tailgate are co-planar with the tailgate in the horizontally oriented position.

10. The vehicle work area assembly according to claim 8, wherein
    the fence accessory has a tightening mechanism that includes a clamp end that extends into the utility track and a knob end threadedly connected to the clamp end such that tightening the knob end pulls the clamp end against inner surfaces of the utility track clamping the fence accessory to the utility track between the clamp end and the knob end.

11. The vehicle work area assembly according to claim 8, wherein
    the clamping accessory includes an elongated bar and a tightening mechanism that includes a clamp end that extends into the utility track and a knob end threadedly connected to the clamp end such that tightening the knob end pulls the clamp end against inner surfaces of the utility track and pulls the elongated bar toward the main surface and against the workpiecc thereby clamping the workpiece between the elongated bar and the main surface.

12. The vehicle work area assembly according to claim 8, wherein
    the tailgate includes scalar demarcations that extend along a portion of the tailgate parallel to the utility track.

13. The vehicle work area assembly according to claim 12, wherein
    the main surface of the tailgate includes an elongated flat portion that defines a workpiece receiving surface that extends in a widthwise direction of the tailgate between the utility track and the scalar demarcations.

14. The vehicle work area assembly according to claim 13, wherein
the fence accessory has a tightening mechanism that includes a clamp end that extends into the utility track and a knob end threadedly connected to the clamp end such that tightening the knob end pulls the clamp end against inner surfaces of the utility track clamping the fence accessory to the utility track between the clamp end and the knob end with the fence surface extending perpendicular to the workpiece receiving surface.

15. The vehicle work area assembly according to claim 13, wherein
the clamping accessory includes an elongated bar and a tightening mechanism that includes a clamp end that extends into the utility track and a knob end threadedly connected to the clamp end such that tightening the knob end pulls the clamp end against inner surfaces of the utility track and pulls the elongated bar toward the main surface and the workpiece receiving surface thereby clamping the workpiece between the elongated bar and the workpiece receiving surface.

* * * * *